United States Patent [19]

Miyamoto et al.

[11] 4,085,596
[45] Apr. 25, 1978

[54] ABSORPTION REFRIGERATOR OF DOUBLE EFFECT TYPE

[75] Inventors: Seigo Miyamoto, Takahagi; Kazuo Takezoe, Ibaraki; Hayao Yahagi, Hitachi; Shigeo Sugimoto, Ibaraki, all of Japan

[73] Assignee: Hitachi, Ltd., Japan

[21] Appl. No.: 771,209

[22] Filed: Feb. 23, 1977

[30] Foreign Application Priority Data

Mar. 3, 1976 Japan .................. 51-22114

[51] Int. Cl.² .............. F25B 15/00; F25B 33/00
[52] U.S. Cl. .......................... 62/476; 62/489; 62/497
[58] Field of Search .................. 62/489, 476, 497

[56] References Cited

U.S. PATENT DOCUMENTS

| 3,124,938 | 3/1964 | Leonard, Jr. | 62/476 |
| 3,389,574 | 6/1968 | McGrath | 62/476 |
| 3,550,394 | 12/1970 | Peckham | 62/497 |
| 3,608,326 | 9/1971 | Leonard, Jr. | 62/489 |
| 3,608,332 | 9/1971 | Leonard, Jr. | 62/489 |
| 4,028,078 | 6/1973 | Peckham | 62/476 |

*Primary Examiner*—Lloyd L. King
*Attorney, Agent, or Firm*—Craig & Antonelli

[57] ABSTRACT

An absorption refrigerator of double effect type in which at a portion at which a weak solution transported from an absorber to a generator of the absorption refrigerator and a strong solution transported from the generator to the absorber flow in parallel with each other there are provided direct contact type heat exchanging means for flashing the strong solution to produce gaseous refrigerant and absorbing the gaseous refrigerant into the weak solution and the heat exchanging means includes a flash type heat exchanger in which a flash tank and an absorption chamber are disposed adjacent to each other in a pair.

14 Claims, 14 Drawing Figures

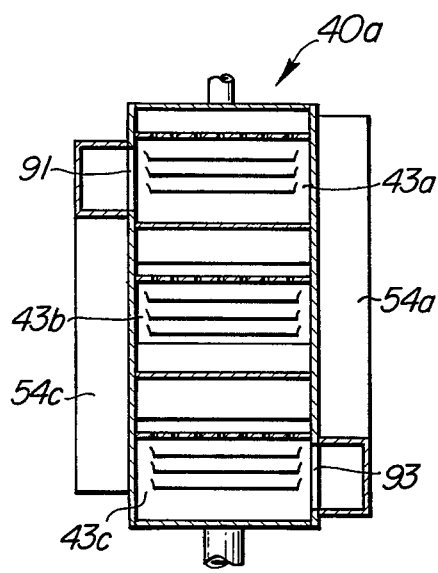
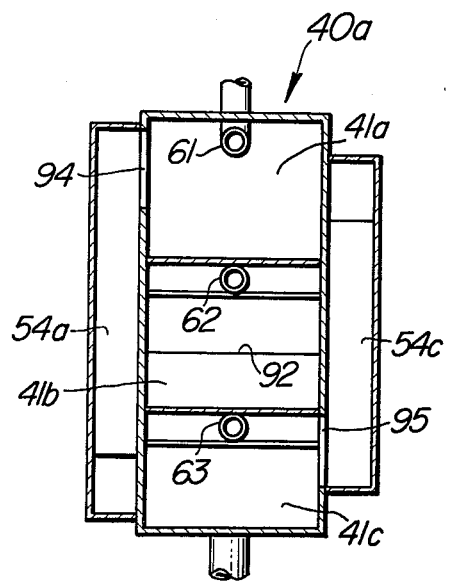
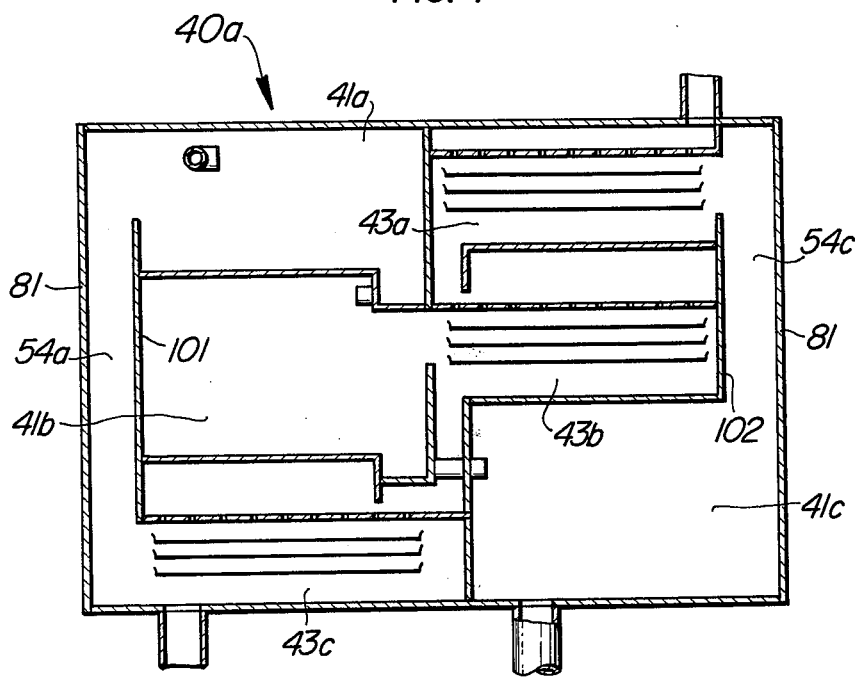

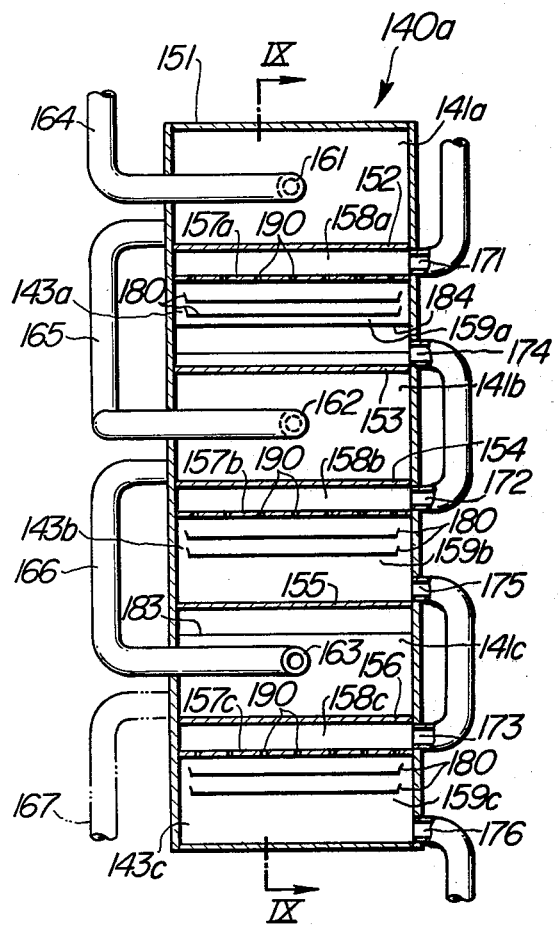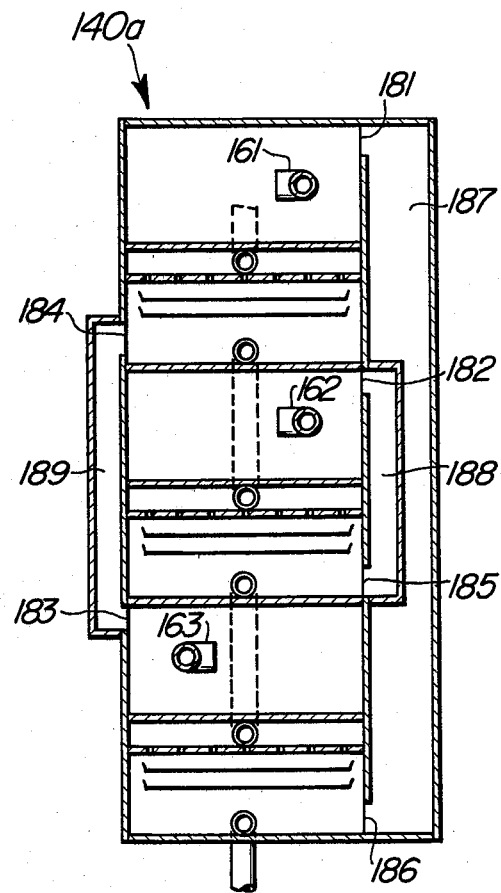

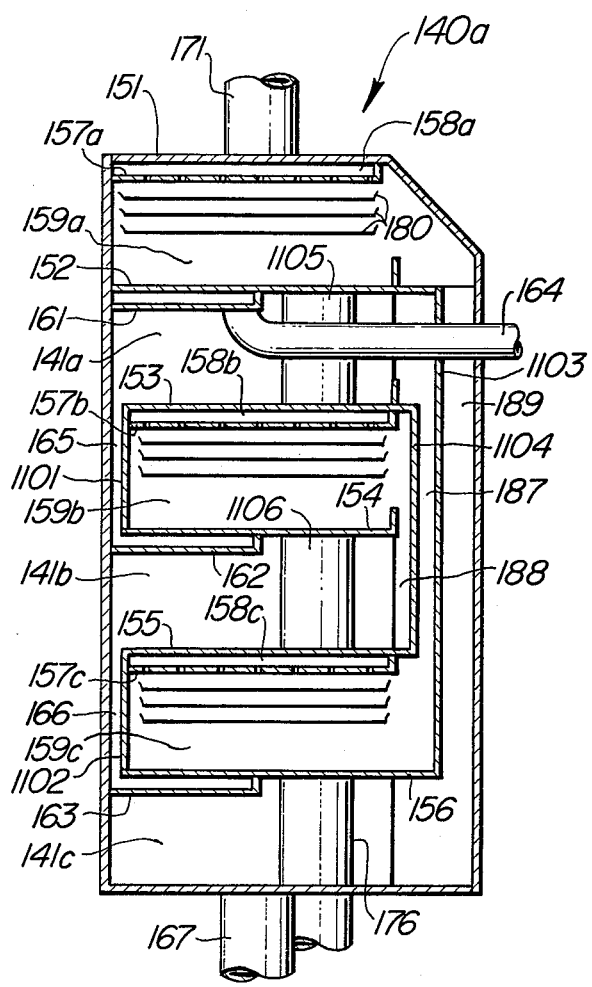

ABSORPTION REFRIGERATOR OF DOUBLE EFFECT TYPE

BACKGROUND OF THE INVENTION

This invention relates to an absorption refrigerator of double effect type and particularly to an arrangement of such an absorption refrigerator provided with a flash type heat exchanger.

Well-known absorption refrigerators are mainly of a single effect type comprising a generator for heating a weak solution to generate vapor of refrigerant, a condenser for condensing and liquidizing the vapor of refrigerant, an evaporator for evaporating the liquidized refrigerant to provide cooling, and an absorber for absorbing the vapor of refrigerant of the evaporator into a strong solution.

However, the thermal efficiency (refrigeration ability/amount of heat) of such a single effect type absorption refrigerator is relatively low and ordinarily about 0.6 in practice and it is, therefore, very important to increase its thermal efficiency under such a circumstance that the cost of fuel is becoming high in the recent time.

With a view to increasing the thermal efficiency, there has recently been put into practice a so-called double effect type absorption refrigerator in which a further generator is additionally provided in the single effect type absorption refrigerator such that the high temperature vapor of refrigerant generated in the first-mentioned generator is utilized to heat the further generator.

In general, the double effect type absorption refrigerator comprises a high temperature generator, a low temperature generator, a condenser, an evaporator, an absorber, a high temperature heat exchanger and a low temperature heat exchanger. In the high temperature generator, a refrigerant dissolved solution, such as an aqueous solution of lithium bromide (hereinunder referred to as solution) is heated by heating means to discharge the dissolved refrigerant as vapor. The discharged refrigerant vapor is fed through a pipe to the low temperature generator to heat the weak solution supplied from the absorber to be described below in more detail, and while the refrigerant in the weak solution is discharged therefrom the vapor of the solution is cooled by the latent heat due to the evaporation and condensed and liquidized to be fed to the condenser. The refrigerant vapor produced in the low temperature generator is supplied through a pipe to the condenser and cooled by cooling means thereof and then condensed and liquidized. This liquidized refrigerant is fed through a pipe to the evaporator to be sprayed therein, thereby cooling its cooling means to exert a cooling function and thus converted to the refrigerant vapor and then fed through a pipe to the absorber which is cooled by the cooling means. On the other hand, the solution concentrated by discharging the refrigerant vapor in the high temperature generator is fed through a pipe to the high temperature heat exchanger to make heat exchange with the low temperature weak solution supplied from the absorber, thereby suitably lowering its temperature, and then fed to the low temperature heat exchanger together with the strong solution derived from the absorber by way of the low temperature generator in which refrigerant is discharged from the solution. In the low temperature heat exchanger, the solution makes heat exchange with the low temperature weak solution derived from the absorber through a pipe, thereby lowering its temperature, and then flows through a pipe to the absorber which is cooled by cooling means. In such a manner, solution sprayed in the absorber absorbs the refrigerant vapor supplied from the above-mentioned evaporator through the pipe, and provides a low temperature weak solution. This solution is further directed through a pipe to the low temperature heat exchanger in which it in turn makes heat exchange with the strong solution derived from the above-mentiond high and low temperature generators, thereby appropriately rising in its temperature, and then is branchedly transported through pipes to the low temperature generator and the high temperature heat exchanger. The solution transported to the high temperature heat exchanger makes heat exchange therein with the high temperature strong solution derived from the high temperature generator through the pipe, thereby rising in its temperature, and then flows back to the high temperature generator through a pipe.

In this manner, the double effect type absorption refrigerator is arranged such that the heat supplied from the exterior is twice utilized in the high and low temperature generators and so the thermal efficiency increases up to 50 - 60% in comparison with the single effect type refrigerator. Furthermore, the double effect type refrigerator is arranged such that the high and low heat exchangers provided in the solution circulation system between the high and low temperature generators and the absorber make heat exchange between the solutions flowing through the system to increase the thermal efficiency and are indispensable to the double effect type absorption refrigerator from the point of reduction of energy. The high and low temperature heat exchangers have ordinarily been formed by multi-tubular type heat exchangers in which heat exchange is made by thermal contact of two fluids through other heat transmitting means.

As described above, the double effect type absorption refrigerator is very useful from the point of thermal efficiency, but it is necessary to increase the generating temperature of the high temperature generator to some extent in order that the refrigerant vapor generated in the high temperature generator is used as a heating source of the low temperature generator. Therefore, there are the following problems;

(1) As is well known, the high temperature and high concentrated aqueous solution of lithium bromide has high corrosiveness. Therefore, the parts of the high temperature generator can not be prevented from corrosion and it is difficult to maintain their long durability.

(2) The pressure of the high temperature generator rises due to increase in the generating temperature. More specifically, the difference in pressure throughout the entire refrigerator is larger than that in the single effect type refrigerator. Therefore, the transportation of fluids within the absorption refrigerator, such as circulation of solutions, greatly increases the economic load.

(3) In view of the necessity of high generating temperature, the temperature level of the heat source to be used in the refrigerator is limited to its high region. In order to effectively use the waste heat from various plants from the point of recent reduction of energy, low temperature operation of the absorption refrigerators is strongly desired in this technical field. In this respect, it is desired that the working temperature of the generator is lowered without reducing the refrigerating capacity of the refrigerator, but conventional double effect type refrigerators can not satisfy such requirements.

In order to solve the above-mentioned problems of the conventional double effect type absorption refrigerators, it is necessary to reduce the concentration of solution in the high temperature generator to lower the working temperature thereof. In conventional absorption refrigerators, however, mere reduction in the concentration of solution can lower the working temperature of the high temperature generator, but increases the pressure of the absorber, thereby not enabling to prevent great reduction in the cooling ability. To prevent this, there are proposed such methods that the heat transmitting surfaces of elements constructing the absorption refrigerator are formed by high performance heat transmitting surfaces, such as gilled tubes, or that the heat transmitting surface is increased. However, the former method not only increases the manufacturing cost of refrigerators, but also makes a change with the lapse of time of the heat transmitting performance, and the latter method must make apparatus large in size and make its capacity small for its size. Therefore, these methods are not always desirable from the industrial point of view.

To solve those problems, means for adjusting the concentration of solution are provided in the solution circulation system between the generators and the absorber to adjust the concentration of solutions relative to each other such that the concentration of solution supplied from the absorber to the high temperature generator is lowered without varying the concentration of solution in the absorber. With this, it is possible to lower the working temperature of the high temperature generator without reducing the cooling ability.

With conventional solution heat exchangers provided in the solution circulation system, however, it is impossible to adjust the above-mentioned relative concentration of solutions, but the above-mentioned requirements can be satisfied by the application of the flash type heat exchange system used in the chemical industry. More specifically, the adjustment of the solution concentration can be made by the provision of means having a function for flashing the strong solution fed from the generator to the absorber as well as a function for absorbing the vaporized refrigerant produced in the above-mentioned step into the weak solution fed from the absorber to the generator. Accordingly, by the provision of such concentration adjusting means in the solution circulation system the concentration of solution in the high temperature generator can be lowered without varying the concentration of solution in the absorber, thereby attaining low temperature operation of the high temperature generator. Moreover, in such concentration adjusting means the heat flow is caused simultaneously with the movement of the vaporized refrigerant and thus heat recovery can be made from the high temperature strong solution to the low temperature weak solution and this is effective from the point of increasing the thermal efficiency of the refrigerator.

SUMMARY OF THE INVENTION

The present invention was made in view of the above, and an object of the present invention is to provide a double effect type absorption refrigerator arranged such that the thermal efficiency is high and the concentration of solution in the high temperature generator can be lowered without varying the concentration of solution in the absorber to attain low temperature operation of the high temperature generator and the flash type heat exchanging means are suitably disposed to exert its proper function without obstructing the operation of the refrigerator.

Another object of the present invention is to attain the reduction in size of the flash type heat exchanger incorporated in the double effect type absorption refrigerator.

A feature of the present invention resides in that at a passage through which vapor is directed from a generator to a condenser a further generator having a lower temperature than that of said generator is disposed, a weak solution from an absorber being directed to the low temperature generator to make heat exchange with vapor from the high temperature generator, thereby evaporating refrigerant to produce a strong solution, said strong solution being incorporated with a strong solution from the high temperature generator to be circulated to the absorber, and a flash type heat exchanging means for effecting the flashing of the strong solution to produce gaseous refrigerant and also the absorption of the gaseous refrigerant into the weak solution being disposed at a portion where the weak solution transported from the absorber to both of the generators and the strong solution transported from both of the generators to the absorber flow in parallel with each other.

Another feature of the present invention lies in that at a portion where a weak solution transported from an absorber to a generator and a strong solution transported from the generator to the absorber flow in parallel with each other the heat exchange is made between the solutions circulating between the generator and the absorber, there being provided a flash type heat exchanger including a plurality of flash tanks for flashing solution to concentrate the same and cool solution itself and a plurality of absorption chambers for absorbing into solution the refrigerant vapor produced in the flash tanks to dilute solution and increase its temperature and the arrangement being such that one absorption chamber and one flash tank of the heat exchanger are disposed in a pair adjacent to each other.

BRIEF DESCRIPTION OF THE DRAWINGS

FIGS. 5 and 6 are sectional views taken along lines A—A and B—B, respectively, of FIG. 4;

FIG. 7 is an elevational sectional view of a third embodiment of the flash type heat exchanger;

FIG. 8 is an elevational sectional view of a fourth embodiment of the flash type heat exchanger;

FIG. 9 is a sectional view taken along a line C—C of FIG. 8;

FIG. 10 is a side elavational sectional view of a fifth embodiment of the flash type heat exchanger.

DESCRIPTION OF THE PREFERRED EMBODIMENTS

Figure 1:
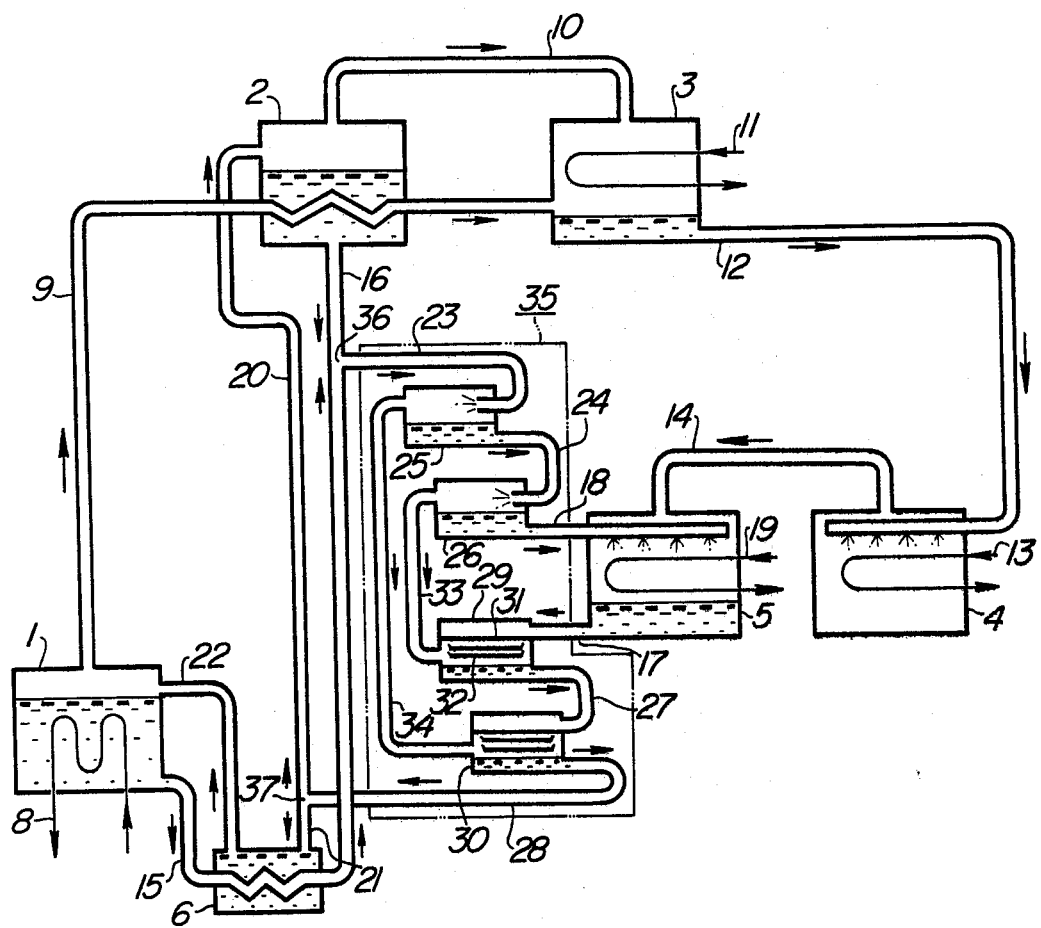
FIG. 1 is a schematic view of an embodiment of the double effect type absorption refrigerator according to the present invention.

FIG. 1 shows a construction of a first embodiment of the double effect type absorption refrigerator of the present invention incorporated into a flash type heat exchanger.

Referring to FIG. 1, the double effect type absorption refrigerator comprises a high temperature generator 1, a low temperature generator 2, a condenser 3, an evaporator 4, an absorber 5, a high temperature heat exchanger 6 and a flash type heat exchanger 35 to be described hereinbelow more in detail.

A refrigerant dissolved solution, such as an aqueous solution of lithium bromide (hereinunder referred to as solution) is heated by heating means 8 in the generator 1 to discharge the dissolved refrigerant as vapor. The discharged refrigerant vapor is fed through a pipe 9 to the low temperature generator 2 to heat a weak solution supplied from the absorber 5, thereby discharging the refrigerant from the weak solution, and thus is cooled, condensed and liquidized by the latent heat caused by the evaporation of said refrigerant and then is directed to the condenser 3. The refrigerant vapor produced in the low temperature generator 2 is supplied through a pipe 10 to the condenser 3 and is cooled by cooling means 11 thereof and then condensed and liquidized. This liquidized refrigerant is then fed through a pipe 12 to the evaporator 4 to be sprayed therein, thereby cooling its cooled means 13. The refrigerant which has exerted the cooling function in such a manner is converted to the refrigerant vapor and then is fed through a pipe 14 to the absorber 5 which is cooled by cooling means 19. On the other hand, solution concentrated by discharging the refrigerant vapor in the high temperature generator 1 is fed through a pipe 15 to the high temperature heat exchanger 6 to make heat exchange with the low temperature weak solution supplied from the absorber 5, thereby suitably lowering its temperature. The solution of which temperature is lowered is fed from the absorber 5 to flow to the flash type heat exchanger 35 together with a strong solution supplied through the low temperature generator 2 in which the refrigerant is discharged, and through a pipe 16. In the heat exchanger 35, solution makes heat exchange with the low temperature weak solution supplied from the absorber 5 through a pipe 17 and further lowers its temperature and then enters through a pipe 18 into the absorber 5 which is cooled by cooling means 19. Thus solution sprayed within the absorber 5 absorbs the refrigerant vapor derived from the evaporator 4 through the pipe 14 and is converted to a low temperature weak solution. This low temperature weak solution is further directed through a pipe 17 to the flash type heat exchanger 35 in which solution in turn makes heat exchange with the strong solution supplied from the high and low temperature generators 1 and 2, thereby appropriately increasing its temperature, and then is branchedly transported through pipes 20 and 21 to the low temperature regenerator 2 and the high temperature heat exchanger 6. The solution transported to the high temperature heat exchanger 6 makes heat exchange therein with the high temperature strong solution derived from the high temperature generator 1 through the pipe 15, thereby increasing its temperature, and then flows back to the high temperature generator 1 through a pipe 22.

In this embodiment of the double effect type absorption refrigerator arranged as is described above, the flash type heat exchanger 35 is interposed between a junction point 37 at which solutions supplied from the high and low temperature generators 1 and 2 to the absorber 5 join together with each other, and a branched point 37 at which solutions supplied from the absorber 5 to the high and low temperature generators 1 and 2 are branchedly transported. The heat exchanger 35 includes two-stage flash tanks 25, 26 and two-stage absorption chambers 29, 30. A pipe 23 is connected at its one end to the pipe 15 communicated with the high temperature generator 1 and also to the pipe 16 communicated with the low temperature generator 2, and at the other end to the first flash tank 25 of the flash type heat exchanger 35 to open thereto. The first flash tank 25 is connected to the second flash tank 26 through a pipe 24 which is open to the latter. The second flash tank 26 is communicated through the pipe 18 with a spraying device of the absorber 5. On the other hand, the first absorption chamber 29 is communicated through the pipe 17 with the absorber 5, and the interior of the chamber 29 is divided into two chambers by a spraying device, such as a spray plate 31, below which a multi-stage of packing 32 is provided. The first absorption chamber 29 is connected by a pipe 27 to the second absorption chamber 30 which in turn is connected by a pipe 28 to the pipe 21 communicated with the high temperature generator 1 and to the pipe 20 communicated with the low temperature generator 2. Furthermore, the first absorption chamber 29 is communicated through a vapor passage 33 with the second flash tank 26, and the second absorption chamber 30 is also communicated through a vapor passage 34 with the first flash tank 25.

In the so-arranged solution circulation system between the high and low temperature generators and the absorber of the double effect type absorption refrigerator, solutions concentrated by discharging the refrigerant vapor in the high and low temperature generators 1 and 2, respectively, flow through pipes 15 and 16 to join and mix with each other and then flow through the pipe 23 to the first flash tank 25 of the flash type heat exchanger 35. Within the chamber 25 solution is flashed dependent upon the pressure therein to dissociate the dissolved refrigerant as vapor and is concentrated and cooled by the latent heat removed by the evaporation of the refrigerant, and then is directed through the pipe 24 to the second flash tank 26. Thereafter, similar operation is repeated and thus solution is increased in its concentration to lower its temperature and flows through the pipe 18 to the absorber 5. The solution diluted in the absorber 5 is supplied through the pipe 17 to the first absorption chamber 29. The solution which has flowed into the chamber 29 is then sprayed by the spraying device, such as spray plate 31, onto the surface of the multi-stage of the packing 32 disposed in the chamber and flows down. At this time, solution absorbs the refrigerant vapor which is produced in the second flash tank 26 and supplied through the vapor passage 33, and is diluted thereby, and its temperature is increased by the latent heat caused by the condensation of the refrigerant vapor, and then solution is supplied through the pipe 27 to the second absorption chamber 30. Thereafter, similar operation is repeated and solution from the absorber 5 rises in its temperature with its concentration reduced and then branchedly flows back through the pipes 28, 21 and 20 to the high and low temperature generators 1 and 2.

In this manner, in the flash type heat exchanger 35 the control of concentration and the heat exchange between the absorbing solutions circulating between the high and low temperature generators 1 and 2 and the absorber 5 are achieved by means of the dissolved refrigerant.

It has been found that for variation in the load condition of the refrigerator, the pressure difference between the pressures at the inlet and outlet of the flash type heat exchanger merely varies within the range of 0 to 30 mmHg at the largest. In such an arrangement as that of the above embodiment, the pressure difference is within the similar range. Therefore, if the variation in pressure is within the range mentioned above, the flash type heat exchanger constructed as is described with reference to the above embodiment can always provide stable flow of solution by a simple arrangement and can fully exert the heat recovery and concentration control which are its proper functions.

Figure 2:
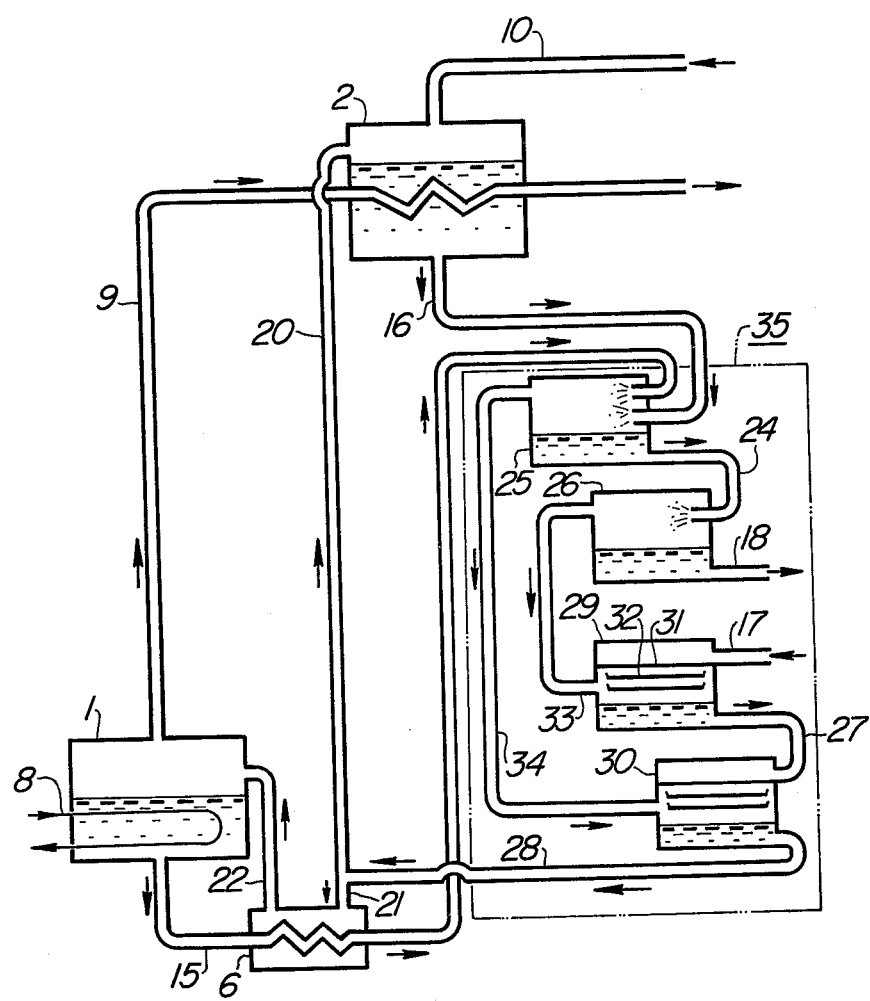
FIG. 2 is a schematic view of part of another embodiment of the refrigerator of the present invention.

In the double effect type absorption refrigerator provided with the above-mentioned flash type heat exchanger, solutions fed from the high and low temperature generators 1 and 2 through the pipes 15 and 16, respectively, join together with each other and then enter into the heat exchanger 35 through the pipe 23. In this case, however, it is necessary that the pressures of the both solutions are equal to each other at the inlet of the pipe 23, that is, at the junction point 36, in order to rapidly join the both solution directed from the high and low temperature generators 1 and 2. In case that the pressures of solutions are different from each other at the junction point 36, there will be a risk that solution having a lower pressure can not enter into the pipe 23. FIG. 2 shows an embodiment in which such a risk is minimized.

Referring to FIG. 2, the pipe 15 communicated with the high temperature generator 1 and the pipe 16 communicated with the low temperature generator 2 are separately provided to be communicated with the first flash tank 25 of the flash and absorption type heat exchanger 35 to open thereinto. Therefore, solutions fed from the high and low temperature generators 1 and 2 through the pipes 15 and 16, respectivley, flow directly into the first flash tank 25.

Since, in operation, the pressure within the first flash tank 25 is always lower than that within the pipes 15 and 16, the respective solutions fed from the high and low temperature generators 1 and 2 flow into the flash tank 25 irrespective of the pressure difference, and thus the problem mentioned with respect to the first embodiment is solved.

The above-mentioned embodiment is of the flash type heat exchanger which can fully exert its function without obstructing the operation of the absorption refrigerator. The absorption refrigerator provided with the flash type heat exchanger may inevitably become large in size and so it is desirable to make the apparatus small in size and light in weight. Especially, it is necessary to make the flash type heat exchanger itself small in size and light in weight, and miniaturization by arranging the absorption chambers and flash tanks of the flash type heat exchanger in the system of the absorption refrigerator is important to the absorption refrigerator. Furthermore, there are various problems, such as a passage resistance of the vapor passage becoming large, when the heat exchanger is made small in size.

In the below-described embodiments, the arrangement of the absorption chambers and flash tanks constituting the flash type heat exchanger is devised mainly to attain the miniaturization of the apparatus.

In conventional double effect type absorption refrigerator, the pressure of solution reaching the inlet of the flash tank of the flash type heat exchanger is about 40 mmHg absolute, and the cooling load is 100%. On the other hand, the pressure of solution flowing into the absorber by way of the evaporation stage of the heat exchanger is about 10 mmHg absolute dependent upon the pressure within the absorber. At the evaporation stage of the heat exchanger, therefore, while the pressure of solution reduces from 40 mmHg absolute to 10 mmHg absolute, solution is flashed to dissociate the refrigerant as vapor and increase the concentration of solution, and solution is cooled and supplied to the absorber. On the contrary, at the absorption stage of the heat exchanger, the pressure of solution is increased from about 10 mmHg absolute of the absorber to about 40 mmHg absolute determined by the performances of the high and low temperature generators and the heat exchanger, while solution is further diluted by absorbing the refrigerant vapor produced at the flashing stage and the temperature of solution is increased, and then solution flows out from the absorber.

Considering such pressure variations at the flashing and absorption stages, therefore, it is advantageous from the point of smooth flow of solution that each of the stages is formed into a multi-stage such that the pressure is gradually decreased at the flashing stage and is gradually increased at the absorption stage. From the point of the efficiency of heat recovery, moreover, the multi-stage is advantageous because the single stage makes the apparatus large in size, and the overall efficiency will be increased by using a so-called counter flow type combination in which the flash tank at the outlet of the flashing stage and the absorption chamber at the inlet of the absorption stage are communicated with each other.

Although the miniaturization of the apparatus and the smooth flow of solution are attained by forming the respective stage into multi-stage in such a manner as is described above, the following points should be considered in respect of the arrangement of the apparatus.

(1) In the flashing stage solution should be transported in the direction of decreasing the pressure. In the absorption stage, however, solution absorbs the refrigerant vapor to reduce its concentration, thereby increasing the saturation pressure of solution towards the lower stage. Therefore, in the absorption stage solution has to be transported in the direction of increasing the pressure, but there is a large pressure difference between the adjacent stages and so it is a problem to stably transport solution without delay.

(2) Since the force required for moving the vapor from the flash tank to the absorption chamber is obtained by a very small pressure difference, the passage resistance for vapor greatly affects an amount of vapor to be moved. It is, therefore, necessary to minimize the passage resistance and simplify the vapor passage.

(3) The loss of fluid flow in the transporting means is high and an additional head of solution for making up said loss is necesswry. This means increase in the amount of solution held between the adjacent stages and a large amount of refrigerant absorbing agent has to be pre-filled in the absorption refrigerator. If an amount of solution to be filled is increased, the economic performance becomes lowered and the volume of solution flowing through the apparatus increases during the running operation at which the concentration of solution is reduced. Therefore, an amount of solution staying in the respective chambers is increased, and especially in the absorption refrigerator the packing (means for enhancing the absorbing effect) are dipped in solution, and a trouble is caused that the respective absorption chambers can not exert their intended performance. To avoid this, it is necessary that means for transporting solution between the stages are shortened as much as possible and simplified to reduce the loss of flow of solution.

(4) Since the apparatus is means for recovering heat, the reduction of heat emission to the exterior is indispensable to increase in the thermal efficiency. For this purpose, it is neccessary that means for transporting solution and vapor passages should be disposed within the apparatus so that the outer surface of the apparatus is reduced as much as possible to provide a compact construction.

The above-mentioned points as well as miniaturization of the apparatus have to be considered in respect of the arrangement of the absorption chambers and flash tanks of the flash type heat exchanger.

Figure 3:
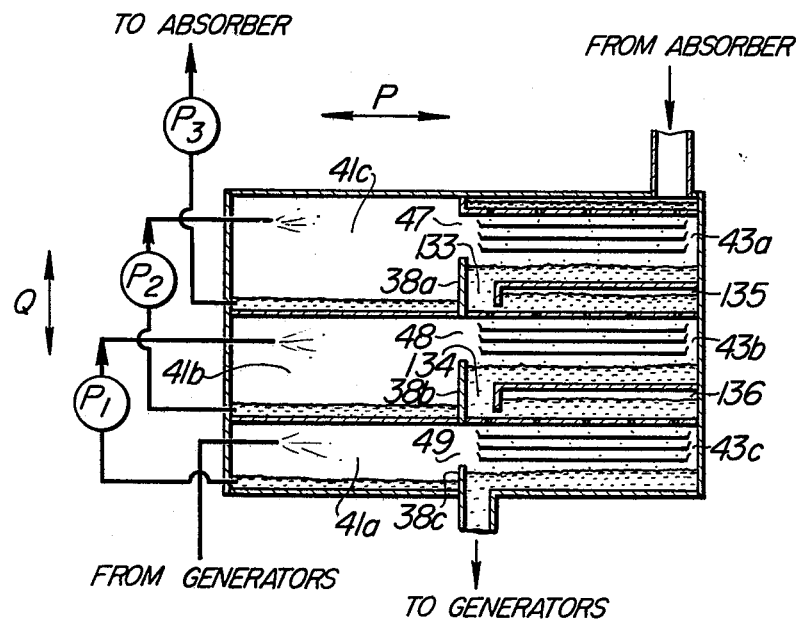
FIG. 3 is an elevational sectional view of an embodiment of a flash type heat exchanger incorporated in the refrigerator of the present invention.

FIG. 3 shows an embodiment of the flash type heat exchanger employed in the double effect type absorption refrigerator of the present invention.

Referring to FIG. 3, the flash type heat exchanger is arranged such that absorption chambers 43a, 43b, 43c and flash tanks 41a, 41b, 41c are respectively coupled horizontally (in the direction of an arrow P) and these couples are laid into three stages vertically (in the direction of an arrow Q. Thus, the entire size of the heat exchanger is very small.

Furthermore, the absorption chambers 43a, 43b, 43c constituting the absorption stage are stepedly disposed to provide a fluid head neccessary for the flow of solution. More specifically, the low pressure absorption chamber 43a (the absorption chamber into which the weak solution from the absorber initially flows) is disposed at the uppermost position and the higher pressure absorption chambers 43b, 43c are in turn disposed thereunder. Thus, the fluid head neccessary for causing the flow of solution from the upper stage to the subsequent stage against the pressure difference existing between the adjacent absorption chambers is caused in solution transporting means 133, 134. In this case, the spaces (dead spaces) defined by the provision of the steps are effectively utilized as solution distribution chambers 135, 136 for the respective absorption chambers.

In order to simplify the vapor passage for conveying vapor from the flash tank to the absorption chamber, on the other hand, the flash tanks 41a, 41b, 41c are disposed in parallel with the respective absorption chambers so as to be provided therebetween with side walls 38a, 38b, 38c of the absorption chambers. More specifically, similarly to the absorption stage, the larger pressure flash tank 41a (the flash tank into which the strong solution from the generators 1, 2 initially flows) is disposed at the lowermost position and the lower pressure flash tanks 41b, 41c are in turn disposed thereabove such that the flash tanks and absorption chambers having a substantially equal pressure are horizontally disposed in parallel with one another.

With this arrangement, there is no need for providing any further vapor passages, and as shown in FIG. 3, vapor passages 47, 48, 49 for communicating between the respective flash tanks and absorption chambers are very effective for the flows of vapor from the flash tanks to the absorption chambers. Furthermore, packing, such as nets, for increasing the surface for flashing may be provided within the respective flash tanks 41a, 41b and 41c so as to exert the effect that the flash tanks can be made small in size without lowering the flashing efficiency thereof and thus the apparatus can be made small in its overall size.

In FIG. 3, $P_1$ and $P_2$ are pumps for transporting the solution between the adjacent flash tanks 41a, 41b, 41c, and $P_3$ is a pump for transporting solution within the flash tank 41c to the absorber.

Figure 4:
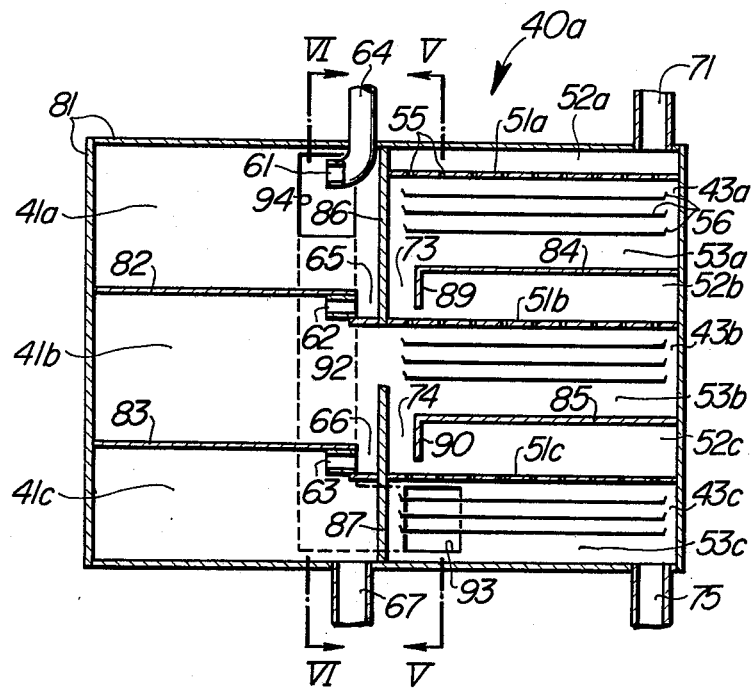
FIG. 4 is an elevational sectional view of another embodiment of the flash type heat exchanger.

The second embodiment of the flash type heat exchanger is shown in FIGS. 4, 5 and 6.

The embodiment shown in FIG. 3 can attain the purpose of miniaturizing the apparatus, but is somewhat disadvantageous in that it is uneconomical, because in the flashing stage there must be provided appropriate mechanical means, such as pumps, for transporting solution between the adjacent flash tanks and these are provided between the steps. The embodiment shown in FIGS. 4, 5 and 6 eliminates such a drawback.

Referring first to FIG. 4, a flash type heat exchanger 40a has a box-shaped outer shell member 81. By the outer shell member 81 and partition wall members 82, 84, 86, a first flash tank 14a and a first absorption chamber 43a are defined to be horizontally provided in parallel with each other. By the outer shell member 81, the partition wall members 82, 84 and further partition wall members 83, 85, 87, a second flash tank 41b and a second absorption chamber 43b are defined under the first flash tank and absorption chambers. By the outer shell member 81 and the partition wall members 83, 85, 87, a third flash tank 41c and a third absorption chamber 43c are defined under the second flash tank and absorption chambers, respectively. The first absorption chamber 43a is communicated through solution introducing means 71 with an absorber (not shown), and the third absorption chamber 43c is also communicated through solution discharging means 75 with a low temperature generator (not shwon) and a high temperature generator (not shown). Furthermore, the first flash tank 41a is communicated through solution transporting means 64 with the low temperature generator, and the third flash tank 41c is communicated through solution transporting means 67 with the absorber. Moreover, the first flash tank 41a and the third absorption chamber 43c, the second flash tank 41b and the second absorption chamber 43b, and the third flash tank 41c and the first absorption chamber 43a are coupled, respectively.

The first, second and third absorption chambers 43a, 43b and 43c are divided by solution spraying means 51a, 51b and 51c into solution distributing chambers 52a, 52b and 52c and packing containing chambers 53a, 53b and 53c, respectively. Opening into the solution distributing chamber 52a of the first absorption chamber 43a are means 71 for directing the solution thereinto from the absorber. A passage 73 for conveying solution from the first absorption chamber 43a to the solution distributing chamber 52b of the second absorption chamber 43b is formed by the partition wall member 86 and a member 89. A passage 74 for conveying solution from the second absorption chamber 43b to the solution distributing chamber 52c of the third absorption chamber 43c is formed by the partition wall member 87 and a member 90. Means 75 for discharging solution from the third absorption chamber 43c are connected to a lower portion of the packing containing chamber 53c of the chamber 43c. The packing containing chambers 53a, 53b and 53c serve to absorb the refrigerant vapor into solution therein and are provided with a plural stages of packing 56 for enhancing the absorption of the refrigerant vapor. Further, opening into the packing containing chambers 53a, 53b, 53c are vapor inlet ports 91, 92 (acting as vapor outlet ports of the flash tank described below) and 93 (refer to FIG. 5) for introducing the refrigerant vapor produced in the flash tank. The solution spraying means 51a, 51b, 51c are formed with small holes 55, respectively, for uniformly distributing solution over the entire surface of the packing 56 disposed in the packing containing chambers 53a, 53b, 53c.

Opening into the first flash tank 41a are solution transporting means 64 which are provided at its end with solution injecting means 61, and the first flash tank 41a is communicated with the subsequent second flash tank 41b through solution transporting means 65. The means 65 are provided with solution injecting means 62 to open into the second flash tank 41b. The second flash tank 41b is communicated with the subsequent third flash tank 41c through solution transporting means 66 which are provided with solution injecting means 63. Further, connected to the lower portion of the third flash tank 41c are solution transporting means 67 for transporting solution of the third flash tank 41c to the absorber. Provided in the flash tanks, respectively, are vapor outlet ports 94, 92, 95 (refer to FIG. 6) for supplying vapor to the respective absorption chambers. The vapor outlet port 94 is connected by vapor passage 54a to the vapor inlet port 93 so that the vapor produced in the first flash tank 41a is introduced into the third absorption chamber 43c. The vapor outlet port 95 is also connected by vapor passage 54c to the vapor inlet port 91 so that the vapor produced in the third flash tank 41c is introduced into the first absorption chamber 43a.

In the flash and absorption type heat exchanger arranged as is described above, in the absorption stage the weak solution discharged from the absorber (not shown) is fed through the solution introducing means 71 to the solution distributing chamber 52a. Said solution is stored in the chamber 52a and then sprayed over the entire surface of the packing 56 through the holes 55 formed in the solution spraying means 51a. While flowing down along the surface of the packing 56, the weak solution absorbs the refrigerant vapor which has been produced in the third flash tank 41c and fed through the vapor outlet port 95, the vapor passage 54c and the vapor inlet port 91, and thus solution is diluted thereby and its temperature is increased by the latent heat produced by the condensation of the refrigerant vapor. Thereafter, solution is fed to the solution distributing chamber 52b of the subsequent second absorption chamber 43b through the solution transporting means 73 open to the lower portion of the packing containing chamber 53a. Similarly to the operation in the first absorption chamber 43a, in the second absorption chamber 43b solution absorbs the refrigerant vapor fed from the second flash tank 41b through the vapor inlet port 92, and in the third absorption chamber 43c solution absorbs the refrigerant vapor fed from the first flash tank 41a through the vapor passage 54a, and in so doing solution is diluted with its temperature increased, and then discharged from the heat exchanger 40a.

In the evaporation stage, on the other hand, the strong solution fed from the low temperature generator (not shown) and the high temperature generator (not shown) through the solution transporting means 64 is injected by the solution injecting means 61 into the first flash tank 41a and then flashed dependent upon the pressure therewithin. The refrigerant dissolved in solution is dissociated as vapor and thus solution is concentrated and cooled by the removal of the evaporation latent heat, and directed to the subsequent second flash tank 41b through the solution transporting means 65 provided on the bottom portion of the first flash tank 41a. The refrigerant vapor produced in the first flash tank 41a is fed through the vapor outlet port 94, the vapor passage 54a and the vapor inlet port 93 to the third absorption chamber 43c. Similarly, the vapor produced in the second flash tank 41b is fed through the vapor output port 92 to the second absorption chamber 43b, and the vapor produced in the third flash tank 41c is also fed through the vapor outlet port 95, the vapor passage 54c and the vapor inlet port 91 to the first absorption chamber 43a. In this manner, the strong solution flowing in the flash stage is more and more concentrated with its temperature increased, and then discharged from the heat exchanger 40a through the solution transporting means 67.

With this embodiment, therefore, the apparatus can be miniaturized and also the rapid and stable flow of solution throughout the flash and absorption stages can be achieved without using any mechanical means, such as pumps. Especially, the arrangement in which the flash tanks are disposed adjacent to one another substantially removes intermittent steps to the flow of solution in the flash stage and there is no need to provide any additional means for transporting solution from the upper stage to the subsequent stage. Therefore, the above-mentioned drawback caused by the resistance against the flow of solution is removed and the number of constructive parts is reduced. With this arrangement, such effects are brought forth that the vertical length of the apparatus can be shortened and thus the loss of flow of the vapor in the vapor passages is reduced to increase the vapor movement performance of the heat exchanger.

FIG. 7 shows a third embodiment of the flash type heat exchanger and parts similar to those of FIGS. 4, 5 and 6 are designated by the same reference numerals. This embodiment is different from that of FIGS. 4, 5 and 6 only in that the absorption chamber of the last stage is disposed under the flash tank of the first stage and the flash tank of the last stage is disposed under the absorption chamber of the first stage. Of course, the respective flash tanks and absorption chambers are coupled and horizontally positioned in parallel with one another.

With this arrangement, the construction of the vapor passages can be simplified and the vapor passages can easily be provided within the heat exchanger. Referring to FIG. 7, the third absorption chamber 43c is disposed immediately below the first flash tank 41a and the third flash tank 41c is disposed immediately below the first absorption chamber 43a. A space defined by the outer shell member 81 of the heat exchanger 40a and a side wall member 101 of the second flash tank 41b serves as the vapor passage 54a connecting between the first flash tank 41a and the third absorption chamber 43c. A space defined by the outer shell member 81 and a side wall member 102 of the second absorption chamber 43b serves as the vapor passage 54c connecting between the third flash tank 41c and the first absorption chamber 43c.

With this embodiment, the vapor passages 54a, 54c are simpler than those of the above-described embodiment and thus the loss of flow of the vapor within the passages are reduced. Therefore, the efficiency of vapor movement in the apparatus is increased. Moreover, since the vapor passages are provided within the heat exchanger, the overall outer surface of the heat exchanger is small thereby reducing the radiation to the exterior and improving the rate of heat recovery.

In the embodiments described hereabove, the flash tanks and the absorption chambers are each laid vertically in three stages, but the arrangement of these tanks and chambers is not always limited to such three-stage arrangement.

FIGS. 8 and 9 shows a fourth embodiment of the flash type heat exchanger. Referring to FIGS. 8 and 9, the flash type heat exchanger 140a has a boxshaped outer shell member 151 the interior of which is divided by partition wall members 152, 153, 154, 155 and 156 into six vertically arranged chambers, taht is, a first flash tank 141a, a first absorption chamber 143a, a second flash tank 141b, a second absorption chamber 143b, a third flash tank 141c and a third absorption chamber 143c.

Solution transporting means 164 provided at its end with solution injecting means 161 are open to the first flash tank 141 which in turn is communicated with the subsequent second flash tank 141b through solution transporting means 165. The means 165 are provided at its end with solution injecting means 162 which are open to the second flash tank 141b. The second flash tank 141b is communicated with the subsequent third flash tank 141c through solution transporting means 166 which are provided at its end with solution injecting means 163. Solution transporting means 167 are connected to the third flash tank 141c to transport solution therein to the absorber (not shown). The refrigerant vapor produced in the respective flash tanks 141a, 141b, 141c is directed to the absorption stage through outlet ports 181, 182, 183 provided on the upper portions of the respective tanks.

On the other hand, the first, second and third absorption chambers 143a, 143b and 143c are divided by solution spraying means 157a, 157b and 157c into two chambers, that is, solution storage chambers 158a, 158b, 158c and filler member disposing chambers 159a, 159b, 159c, respectively. Opening to the solution storage chambers 158a, 158b, 158c, respectively, are means 171, 172, 173 for directing solution thereinto. The packing containing chambers 159a, 159b, 159c are each provided with a plural stages of packing 180 for absorbing the refrigerant vapor into solution within the chambers and enhancing the absorption of the refrigerant vapor. Also provided on the lower portions of the packing containing chambers, respectively, are means 174, 175, 176 for discharging therefrom solution which has been subjected to the absorbing function. Referring to FIG. 9, vapor inlet ports 184, 185, 186 for introducing the refrigerant vapor produced in the flash tanks are provided on the lower portions of the packing containing chambers 159a, 159b, 159c. Furthermore, the solution spraying means 157a, 157b, 157c, respectively, are formed with a plurality of small holes 190 for uniformly distributing solution over the entire surface of the packing 180 disposed in the packing containing chambers 159a, 159b, 159c.

As shown in FIGS. 8 and 9, the vapor outlet port 181 is communicated through vapor passage 187 with the vapor inlet port 186 to introduce into the third absorption chamber 143c the vapor produced in the first flash tank 141a, and the vapor outlet port 182 is communicated through vapor passage 188 with the vapor inlet port 185 to introduce into the second absorption chamber 143b the vapor produced in the second flash tank 141b. Similarly, the vapor outlet port 183 is communicated through vapor passage 189 with the vapor inlet port 184 to introduce into the first absorption chamber 143a the vapor produced in the third flash tank 141c.

With this arrangement, the weak solution fed from the absorber (not shwon) enters into the solution storage chamber 158a through the solution introducing means 171. The solution is stored in the chamber 158a and then sprayed over the entire surface of the packing 180 through the holes 190 formed in the solution spraying means 157a. While flowing down along the surface of the packing 180, the weak solution absorbs the refrigerant vapor which is produced in the third flash tank 141c and introduced through the vapor outlet port 183, the vapor passage 189 and the vapor inlet port 184, and solution is diluted with its temperature increased by the latent heat produced by condensation of the vapor. Thereafter, solution is supplied to the subsequent second absorption chamber 143b through the solution discharging means 174 open to the lower portion of the packing containing chamber 159a. Similarly, solution in the second absorption chamber 143b absorbs the refrigerant vapor introduced from the second flash tank 141b, thereby being gradually diluted with its temperature increased. Furthermore, solution in the third absorption chamber 143c absorbs the refrigerant vapor introduced from the first flash tank 141a, thereby being gradually diluted with its temperature increased, and then is discharged from the heat exchanger 140a.

On the other hand, the strong solution from the low temperature generator (not shown) and the high temperature generator (not shown) is injected into the first flash tank 141a by the solution injecting means 161 through the solution transporting means 164 and then is flashed dependent upon the pressure within the tank. Thus, the refrigerant dissolved in solution is dissociated as vapor to concentrate solution, and the latter is cooled by the removal therefrom of the latent heat caused by flashing. The solution is then supplied to the subsequent second flash tank 141b through the solution transporting means 165 provided at the bottom of the tank. At this time, the refrigerant vapor produced in the flash tank 141a is fed through the vapor outlet port 181 of the flash tank and the vapor passage 187 to the third absorption chamber 143c (refer to FIG. 9). Similarly, vapor produced in the second flash tank 141b is supplied through the vapor passage 188 to the second absorption chamber 143b, and vapor produced in the third flash tank 141c is also fed through the vapor passage 189 to the first absorption chamber 143a. In this manner, solution flowing in the flash stage is more and more concentrated with its temperature increased, and then is discharged from the heat exchanger 140a.

According to this embodiment, therefore, the respective absorption chambers are provided to have the potential head necessary for the flow of solution so that in the absorption stage the stable flow of solution can be established without using any other mechanical means. Furthermore, the spaces between the adjacent absorption chambers are utilized as flash tanks of the flash stage thereby reducing the heat emission to the exterior and increasing the efficiency of heat recovery. Moreover, the dead space determined by the potential head required between the adjacent absorption chambers is effectively used as an evaporator so that the apparatus can be compact in its overall size.

Figure 11:
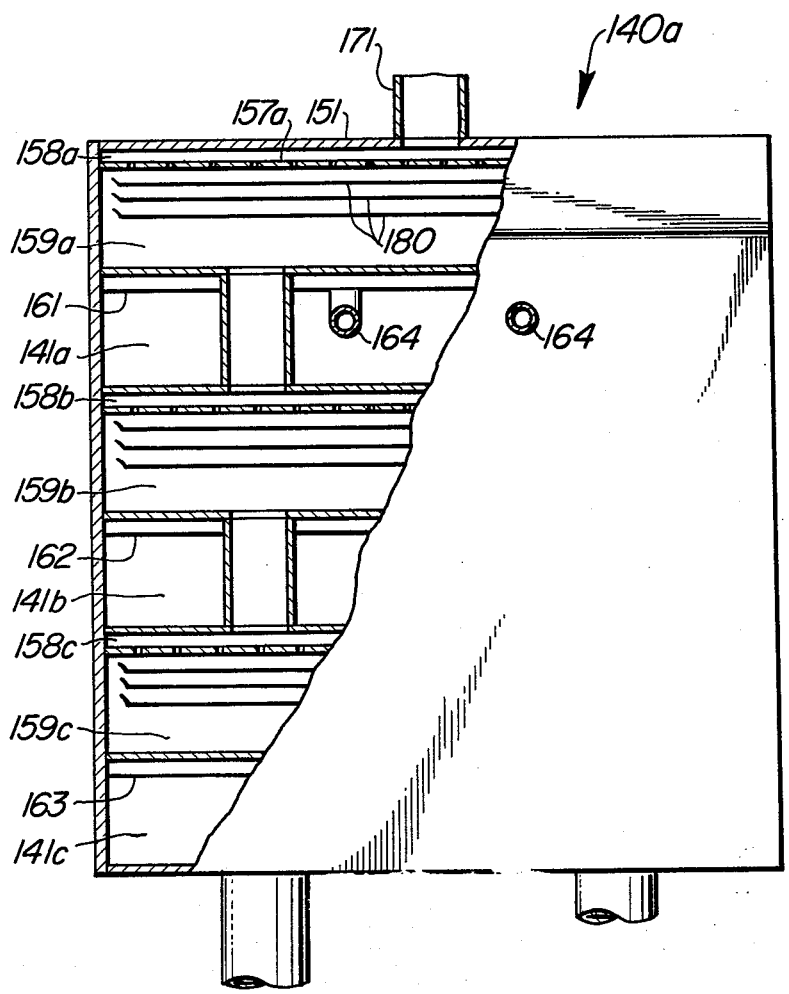
FIG. 11 is a fragmentary front elevational sectional view of the fifth embodiment.

FIGS. 10 and 11 show a fifth embodiment of the flash type heat excahnger and the same parts as those of FIGS. 8 and 9 are designated by the same reference numerals. The embodiment of FIGS. 10 and 11 is different from that of FIGS. 8 and 9 in that the solution transporting means and the vapor passages between the stages are disposed within the heat exchanger. More specifically, the outer shell member 151 of the heat exchanger and a partition wall member 1101 of a second absorption chamber 159b define means 165 for transporting solution from the first flash tank 141a to the second flash tank 141b, and the outer shell member 151 and a partition wall member 1102 of the third absorption chamber 159c define means 166 for transporting solution from the second flash tank 141b to the thrid flash tank 141c. Thus, the solution transporting means 165, 166 are provided within the heat exchanger 140a. Further, means 1105 for transporting solution from a first absorption chamber 159a to the second absorption chamber 159b and means 1106 for transporting solution from the second absorption chamber 159b to the third absorption chamber 159c are provided within the heat exchanger. Moreover, the outer shell member 151 and a partition wall member 1103 define the vapor passage 189 connecting between the third flash tank 141c and the first absorption chamber 159a, and the outer shell member 151 and partition wall members 1103, 1104 define the vapor passage 187 connecting between the first flash tank 141a and the third absorption chamber 159c, and the outer shell member 151 and partition wall member 1104 define the vapor passage 188 connecting between the second flash tank 141b and the second absorption chamber 159b. Thus, the vapor passages 187, 188, 189 are provided within the heat exchanger. Therefore, the apparatus of this embodiment is compact in size, reduces radiation to the exterior and increases the efficiency of heat recovery.

According to the double effect type absorption refrigerator of the present invention described above, in the mid-way through which refrigerant vapor is introduced from the generator to the condenser the generator having a lower tempeature than that of said generator is provided and the weak solution from the absorber is introduced into the low temperature generator in which solution is in turn subjected to heat exchange with vapor from the high temperature generator, thereby producing a strong solution. This strong solution joins together with the strong solution from the high tempeature generator to circulate within the absorber, and at the portion in which the strong solutions to be transported from the absorber to the respective generators flow in parallel with each other there is further provided a flash type heat exchanging means provided with a flash stage for flashing the strong solutions to produce gaseous refrigerant and an absorption stage for absorbing the gaseous refrigerant into the weak solution. Thus, the thermal efficiency is high and the concentration of solution in the high temperature generator is reduced without varying the concentration of solution in the absorber, thereby attaining the low tempeature opeation of the generator. In this manner, the proper functions of the flash type heat exchanger can be exerted without obstructing the operation of the absorption refrigerator. Furthermore, the present invention is arranged such that one of the absorption chambers and one of the evaporation chambers constituting the flash type heat exchanger are disposed adjacent to each other in a pair, thereby bringing forth the effect that the heat exchanger is small in size.

What is claimed is:

1. In a double effect type absorption refrigerator comprising a first generator for heating a weak solution to cause refrigerant to be flashed from said weak solution to produce a strong solution, a condenser for introducing said refrigerant vapor thereinto to condense and liquidize the same, an evaporator for introducing said condensed solution thereinto to produce refrigerant vapor to provide cooling, an absorber for introducing said refrigerant vapor thereinto to dilute the strong solution fed from said first generator, means for causing said weak solution to flow through said first generator, means for circulating said strong solution produced within said first generator toward said absorber, a second generator having a lower temperature than that of said first generator and through which the refrigerant vapor produced in said first generator is directed to said condenser, said second generator being arranged such that the refrigerant vapor from said first generator is caused to heat exchange with the weak solution from said absorber to flash the refrigerant and produce a strong solution said strong solution produced within the first generator flowing into the strong solution produced within the second generator to be circulated into said absorber, the improvement comprising a flash type heat exchanging means provided at a portion at which the weak solution transported from said absorber to said both generators and the strong solution transported from said both generators to said absorber flow in parallel with each other and for flashing said strong solution to produce gaseous refrigerant to be absorbed into said weak solution.

2. A double effect type absorption refrigerator as set forth in claim 1, wherein said flash type heat exchanging means comprises a flash type heat exchanger including a plurality of flash tanks for effecting heat exchange between the solutions circulating between said both generators and said absorber and for flashing the solutions to concentrate and cool the solutions themselves and a plurality of absorption chambers for causing the refrigerant vapor produced in said flash tanks to be absorbed into the solutions to dilute the latter with their temperature increased.

3. In a double effect type absorption refrigerator comprising a generator for heating a weak solution and flashing refrigerant from said weak solution to produce a strong solution, a condenser for introducing said refrigerant vapor thereinto to condense and liquidize the same, an evaporator for introducing said condensed solution thereinto and producing refrigerant vapor to provide cooling, an absorber for introducing said refrigerant vapor thereinto to dilute the strong solution fed from said refrigerator, means for causing said weak solution to flow within said generator, and means for circulating said strong solution produced within said generator toward said absorber, the improvement comprising a flash type heat exchanger provided at a portion at which the weak solution transported from said absorber to said generator and the strong solution transported from said generator to said absorber flow in parallel with each other, said heat exchanger including a plurality of flash tanks for effecting heat exchange between the solutions circulating between said generator and said absorber and for flashing the solutions to concentrate and cool the solutions themselves and a plurality of absorption chambers for causing the refrigerant vapor produced in said flash tanks to be absorbed into the solutions to dilute the latter with their temperature increased, and one of said absorption chambers and one of said flash tanks being disposed adjacent to each other in a pair within said heat exchanger.

4. A double effect type absorption refrigerator as set forth in claim 3, wherein said one of absorption chambers and said one of flash tanks are horizontally disposed in a pair.

5. A double effect type absorption refrigerator as set forth in claim 3, wherein said plurality of absorption chambers are disposed such that there are provided steps therebetween for the flow of solution and at least one of flash tanks is provided in space defined between the absorption chambers.

6. A double effect type absorption refrigerator ss set forth in claim 4, wherein a plurality of pairs of absorption chambers and flash tanks are vertically buil up.

7. A double effect type absorption refrigerator as set forth in claim 6, wherein said absorption chambers and flash tanks at the uppermost stage are lowest in pressure and wherein pressure becomes higher one after another toward the lower chamber which are piled up, and the adjacent absorption chambers and flash tanks have a substantially equal pressure.

8. A double effect type absorption refrigerator as set forth in claim 7, wherein there are provided steps between said absorption chambers to provide heads of solution for flow of solution.

9. A double effect type absorption refrigerator as set forth in claim 6, wherein packing are provided in said flash tanks to increase the area of flash surface.

10. A double effect type absorption refrigerator as set forth in claim 7, wherein said absorption chambers and flash tanks each having a substantially equal pressure are connected to one other by a vapor passage through which the refrigerant vapor flows.

11. A double effect type absorption refrigerator as set forth in claim 6, wherein said uppermost absorption chamber is connected by a vapor passage with the lowermost flash tank, and said uppermost flash tank connected by a vapor passage with the lowermost absorption chamber.

12. A double effect type absorption refrigerator as set forth in claim 7, wherein said each absorption chamber is divided by solution spraying means into two vartically arranged portions such that the upper one forms a solution distributing chamber and the lower one forms a packing containing chamber.

13. A double effect type absorption refrigerator as set forth in claim 12, wherein said solution spraying means are provided with a plurality of holes for uniformly distributing solution in said packing containing chamber.

14. A double effect type absorption refrigerator as set forth in claim 5, wherein said one of absorption chambers and said one of flash tanks are alternately vertically piled up.

* * * * *